UNITED STATES PATENT OFFICE.

WILLIAM G. VOLKMANN, OF OAKLAND, CALIFORNIA, ASSIGNOR TO A. SCHILLING & COMPANY, OF SAN FRANCISCO, CALIFORNIA, A CORPORATION OF CALIFORNIA.

METHOD OF PACKAGING AND PRESERVING TEA.

1,190,691.   Specification of Letters Patent.   Patented July 11, 1916.

No Drawing.   Application filed November 26, 1915. Serial No. 63,635.

*To all whom it may concern:*

Be it known that I, WILLIAM G. VOLKMANN, a citizen of the United States, residing at Oakland, in the county of Alameda and State of California, have invented certain new and useful Improvements in Methods of Packaging and Preserving Tea, of which the following is a specification.

The present invention relates to a method for packaging and preserving tea whereby the same after being fired to drive the moisture therefrom is prevented from absorbing moisture from the atmosphere and thereby losing its flavor and strength.

As at present treated, tea leaves after being fired to drive the moisture therefrom and concentrate the strength therein are, in the handling thereof to place the same before the consumer for preparation for individual consumption, continuously exposed to the atmosphere and absorb therefrom approximately the same percentage of moisture as was contained therein before firing. The tea thus fired absorbing from the atmosphere approximately the same quantity of moisture as was driven therefrom rapidly deteriorates and loses strength and flavor.

In carrying out my improved method, I deposit the tea after being fired, and while in a heated condition, in a container, exhaust the air or draw a vacuum in the container and hermetically seal the same, thus packaging and preserving the hot tea in a vacuum before the same has cooled to an appreciable extent and absorbed moisture from the surrounding atmosphere. The open container is preferably positioned in an air tight receptacle, either after being filled with the hot tea or may be filled with the hot tea after being placed therein, and the vacuum drawn in the receptacle to remove the air from within the container and while in said receptacle with the vacuum drawn thereon, the containers are hermetically sealed before the hot tea is permitted to cool to an appreciable extent.

In packaging the fired tea by my improved method, the same is free from moisture and thoroughly dried, and is not permitted to cool in the atmosphere and absorb the moisture therefrom.

In the treatment or curing of tea, it is necessary to fire the same, and it is preferably immediately after this firing and while hot that the same is packaged and preserved by my improved method.

Having thus described my invention, what I claim as new and desire to protect by Letters Patent is:—

1. The method of packaging and preserving tea, the same consisting in first heating the tea to drive the moisture therefrom, thence placing the same in a package for the hermetic sealing thereof, thence exhausting the air from within the package, and finally hermetically sealing the package before the tea is permitted to cool to an appreciable extent.

2. The method of packaging and preserving tea while in a heated condition, which consists in placing the tea within a suitable container, thence placing the container so filled within a suitable receptacle adapted to be closed to the atmosphere, thence creating a vacuum within said receptacle for the withdrawal of the air from within the filled container, and thence hermetically sealing the said container before the tea is permitted to cool to an appreciable extent.

In testimony whereof I have signed my name to this specification in the presence of two subscribing witnesses.

WILLIAM G. VOLKMANN.

Witnesses:
L. MEYER,
L. MILLER.

Copies of this patent may be obtained for five cents each, by addressing the "Commissioner of Patents, Washington, D. C."